United States Patent [19]

Baumann

[11] 4,280,955
[45] Jul. 28, 1981

[54] SULFO, CHLORO PHENOLAZOACETOACETYLBENZAMIDE DYES

[75] Inventor: Hans Baumann, Wachenheim, Fed. Rep. of Germany

[73] Assignee: BASF Aktiengesellschaft, Ludwigshafen, Fed. Rep. of Germany

[21] Appl. No.: 47,246

[22] Filed: Jun. 11, 1979

[30] Foreign Application Priority Data

Jun. 10, 1978 [DE] Fed. Rep. of Germany ....... 2825517

[51] Int. Cl.³ .................... C09B 29/33; C09B 45/20; D06P 3/06; D06P 3/24
[52] U.S. Cl. .................................... 260/149; 260/193
[58] Field of Search ........................................ 260/149

[56] References Cited

U.S. PATENT DOCUMENTS

| | | | |
|---|---|---|---|
| 1,656,844 | 1/1958 | Straub et al. | 260/149 |
| 2,366,633 | 1/1945 | Long | 260/148 |
| 2,421,315 | 5/1947 | Carson | 260/147 |
| 2,556,743 | 6/1951 | Long | 260/149 |
| 2,969,351 | 1/1961 | Grossmann | 260/149 |
| 3,406,162 | 10/1968 | Neier | 260/145 B |

FOREIGN PATENT DOCUMENTS

| | | | |
|---|---|---|---|
| 102950 | 3/1926 | Austria | 260/149 |
| 1331221 | 5/1963 | France | 260/149 |
| 910120 | 11/1962 | United Kingdom | 260/149 |

*Primary Examiner*—Floyd D. Higel

[57] ABSTRACT

A 1:2 cobalt complex of the formula

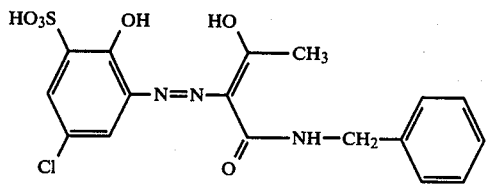

and its alkali metal salts and ammonium salts and methods of preparing the same are disclosed. On wool and nylons, the compounds give yellow dyeings which exhibit good wetfastness and very good lightfastness.

1 Claim, No Drawings

SULFO, CHLORO PHENOLAZOACETOACETYLBENZAMIDE DYES

The present invention relates to a 1:2 cobalt complex dye of the formula

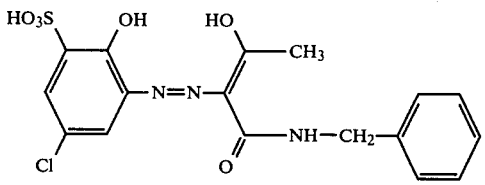

and to its alkali metal salts and ammonium salts.

The term ammonium salts also includes derivatives which are substituted at the ammonium nitrogen, for example by alkyl, eg. methyl, ethyl, propyl, butyl, hydroxyethyl or hydroxypropyl, cyclohexyl, benzyl or phenyl.

On wool and nylons, the compounds give yellow dyeings which exhibit good wetfastness and very good lightfastness. Wetfastness for example includes fastness to washing, perspiration, potting, overdyeing and carbonizing.

Compared to similar acetoacetarylamide dyes, the compounds of the invention give a more greenish hue and better wetfastness, whilst compared to acetoacetalkylamide dyes, they give better lightfastness.

The 4-chloro-2-aminophenol-6-sulfonic acid is diazotized by conventional methods, and the coupling is also carried out in the conventional manner, at a weakly acid to weakly alkaline pH, for example in the presence of sodium acetate, sodium formate or sodium bicarbonate.

The coupling product, which may or may not be isolated, is converted to the complex by a treatment with a cobalt-II salt in a weakly acid to alkaline medium at an elevated temperature, preferably at 50°–90° C.

The pH is adjusted to a suitable value, of from 5 to 9, by means of an alkali metal salt of an aliphatic carboxylic acid, or by means of ammonia or an alkanolamine.

The complex formation is advantageously carried out in the presence of an oxidizing agent, such as atmospheric oxygen or hydrogen peroxide.

The cobalt-II salts used are the chlorides, sulfates or acetates.

Preferably, the complex is prepared in aqueous solution or suspension. By using organic solvents, such as aliphatic carboxylic acid amides, lactams, glycols or glycol ethers, with or without water, and employing an alkanolamine as the pH regulator, storage-stable solutions of the complex dye can be obtained.

EXAMPLE 22.3 parts of 4-chloro-2-aminophenol-6-sulfonic acid are dissolved in 250 parts of ice water and 4.0 parts of sodium hydroxide to give a neutral solution, and after adding 6.9 parts of sodium nitrite, 30 parts of 5 N hydrochloric acid are introduced. After completion of the diazotization, the diazo compound is stirred into a solution of 19.5 parts of acetoacetylbenzylamide, 4.2 parts of sodium hydroxide and 16.2 parts of sodium bicarbonate in 200 parts of ice water. After adding 40 parts of 5 N hydrochloric acid, the resulting coupling product is filtered off and washed on the filter with water. The filter residue is then stirred into 300 parts of water at 60° C. and the dye is dissolved by neutralizing with sodium hydroxide solution; after having added an aqueous solution of 11.9 parts of cobalt-II chloride ($CoCl_2.6\ H_2O$), 35 parts of 5 percent strength aqueous hydrogen peroxide solution are added dropwise at 70° C., whilst stirring.

When a thin layer chromatogram shows that the formation of the complex is complete, the mixture is allowed to cool, 80 parts of sodium chloride are added and the dye which has separated out is filtered off and dried at 80°. This gives 48 parts of a 1:2 cobalt complex dye which dyes wool and nylon fibers in neutral yellow hues. The dyeings exhibit very good lightfastness and wetfastness.

If the coupling product (ie. the monoazo dye) is stirred into 200 ml of aqueous 2 N ammonia solution and a solution of 11.9 parts of cobalt-II chloride in 70 parts of water is added at 60° whilst passing air through the mixture, the dye obtained on working up after completion of complex formation has the same tinctorial properties as the dye obtained in the preceding paragraph.

I claim:
1. A 1:2 cobalt complex dye of the formula

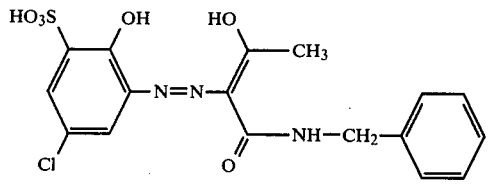

or its alkali metal salts or ammonium salts.

* * * * *